US007183907B2

(12) United States Patent
Simon et al.

(10) Patent No.: US 7,183,907 B2
(45) Date of Patent: Feb. 27, 2007

(54) CENTRAL STATION MONITORING WITH REAL-TIME STATUS AND CONTROL

(75) Inventors: Scott Simon, Melville, NY (US); Gordon Hope, Miller Place, NY (US); William R. Blum, Huntington Station, NY (US)

(73) Assignee: Honeywell International, Inc., Morristown, NJ (US)

( * ) Notice: Subject to any disclaimer, the term of this patent is extended or adjusted under 35 U.S.C. 154(b) by 203 days.

(21) Appl. No.: 10/969,142

(22) Filed: Oct. 20, 2004

(65) Prior Publication Data

US 2006/0092011 A1 May 4, 2006

(51) Int. Cl.
*G08B 1/00* (2006.01)
(52) U.S. Cl. .............. 340/531; 340/573.1; 340/5.2; 340/573.4; 340/10.1
(58) Field of Classification Search .......... 340/531, 340/5.22, 573.1, 5.2, 573.4, 10.1, 10.5, 539.14, 340/541, 5.21, 10.51; 379/44, 37, 49; 709/224; 713/166
See application file for complete search history.

(56) References Cited

U.S. PATENT DOCUMENTS

| | | | | |
|---|---|---|---|---|
| 4,532,507 A | * | 7/1985 | Edson et al. | 340/5.22 |
| 5,686,886 A | * | 11/1997 | Stensney | 340/539.14 |
| 6,078,649 A | * | 6/2000 | Small et al. | 379/39 |
| 6,119,125 A | * | 9/2000 | Gloudeman et al. | 707/103 R |
| 6,225,906 B1 | * | 5/2001 | Shore | 340/573.4 |
| 6,359,564 B1 | * | 3/2002 | Thacker | 340/573.1 |
| 2003/0234731 A1 | | 12/2003 | Rhodes et al. | |
| 2004/0145481 A1 | | 7/2004 | Dilbeck et al. | |

FOREIGN PATENT DOCUMENTS

| | | |
|---|---|---|
| WO | WO 00/72573 A2 | 11/2000 |
| WO | WO 01/40912 A2 | 6/2001 |
| WO | WO0140912 A3 * | 6/2001 |

OTHER PUBLICATIONS

Honeywell "AlarmNet-i" data sheet, printed Jun. 23, 2004 from http://www.alarmnet.com/alarmnet_i.htm.
Honeywell "AlarmNet Network Overview", Aug. 2002, printed from http://www.alarmnet.com/alarmnet_i.htm.
Honeywell "AlarmNet-i Sevices—Dealing With The Challenges of Internet and Intranet Communications", Jan. 2002, printed from http://www.alarmnet.com/alarmnet_i.htm.

* cited by examiner

*Primary Examiner*—Daniel Wu
*Assistant Examiner*—Daniel Previl
(74) *Attorney, Agent, or Firm*—Scully, Scott, Murphy & Presser, P.C.

(57) ABSTRACT

A number of different security systems, such as in home or business locations, periodically transmit status data to a remote facility such as a central monitoring station so that it is continuously informed of the security systems' status. The status may relate to an alarm status, armed status, or trouble code status. A user interface at the remote facility provides a spreadsheet format that allows a user to quickly ascertain the status of the security systems, and to send commands to the security systems. The security systems may be controlled individually or in groups, such as to add or delete authorizations. The user interface can filter or sort the information, or obtain further details. Other information, such as video and audio data from a security system, can also be provided to the remote facility for use in the user interface. Information can be recorded for subsequent playback.

24 Claims, 5 Drawing Sheets

FIG. 7

SETUP EMPLOYEE AUTHORIZATION

1. ENTER EMPLOYEE ID: _____

2. ENTER PASS CODE: _____

3. SELECT LOCATION:

ALL: ☐   STORE 1: ☐   STORE 2: ☐   STORE 3: ☐

4. SELECT SCHEDULE:

MON.-FRI.: ☐   SAT.-SUN.: ☐

5. SELECT SHIFT:

DAY: ☐   NIGHT: ☐

6. SELECT ACCESS AREAS:

ALL: ☐   WAREHOUSE: ☐   OFFICE: ☐   SHOWROOM: ☐

[ SUBMIT ]

CENTRAL STATION MONITORING WITH REAL-TIME STATUS AND CONTROL

BACKGROUND OF THE INVENTION

1. Field of Invention

The invention relates generally to a security system including a central monitoring station that receive periodically updated information from a number of different security systems at different building locations, and that has the ability to control the different security systems individually or in groups.

2. Description of Related Art

Security systems are commonly used in home and business settings to protect against intruders and other dangers. For example, a chain of retail stores may each have a security system that protects their premises. When an intruder or other alarm condition, such as a fire, is detected, the local security system may report the alarm to a central monitoring facility via a telephone link or other communication link. Personnel at the central monitoring facility may then telephone the local police to report the alarm to have the incident investigated. While this approach provides some measure of security, it provides relatively little information to the central monitoring facility. In particular, the central monitoring station only receives a communication from the security systems when there is an alarm condition. Moreover, the central station lacks the ability to control the local security systems.

BRIEF SUMMARY OF THE INVENTION

The present invention addresses the above and other issue by providing a security system including a central monitoring station that receives periodically updated information from a number of different security systems at different building locations. The central monitoring station can therefore be apprised of all information associated with the security systems, such as whether the security system is armed, in an alarm state, or whether there is a trouble code such as due to a hardware or software problem or maintenance need. Furthermore, a user interface, such as a web browser, at the central monitoring station allows a user to easily monitor, and obtain information from, the different security systems, and to control the different security systems individually or in groups. The invention is particularly suitable for use in monitoring and controlling the security systems of businesses such as chain retail stores, although it is applicable as well to other business and residential settings.

In one aspect of the invention, a computer-implemented method for monitoring security systems includes receiving, at a facility that is remote from the security systems, periodically updated information from the security systems, according to respective update intervals of the security systems, and displaying information regarding the security systems, on a user interface, responsive to the periodically updated information. The security systems each secure respective building locations.

A corresponding apparatus is also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 7 illustrates an example user interface at a remote facility, with a display for setting up an employee authorization, according to the invention.

DETAILED DESCRIPTION OF THE INVENTION

Figure 1:
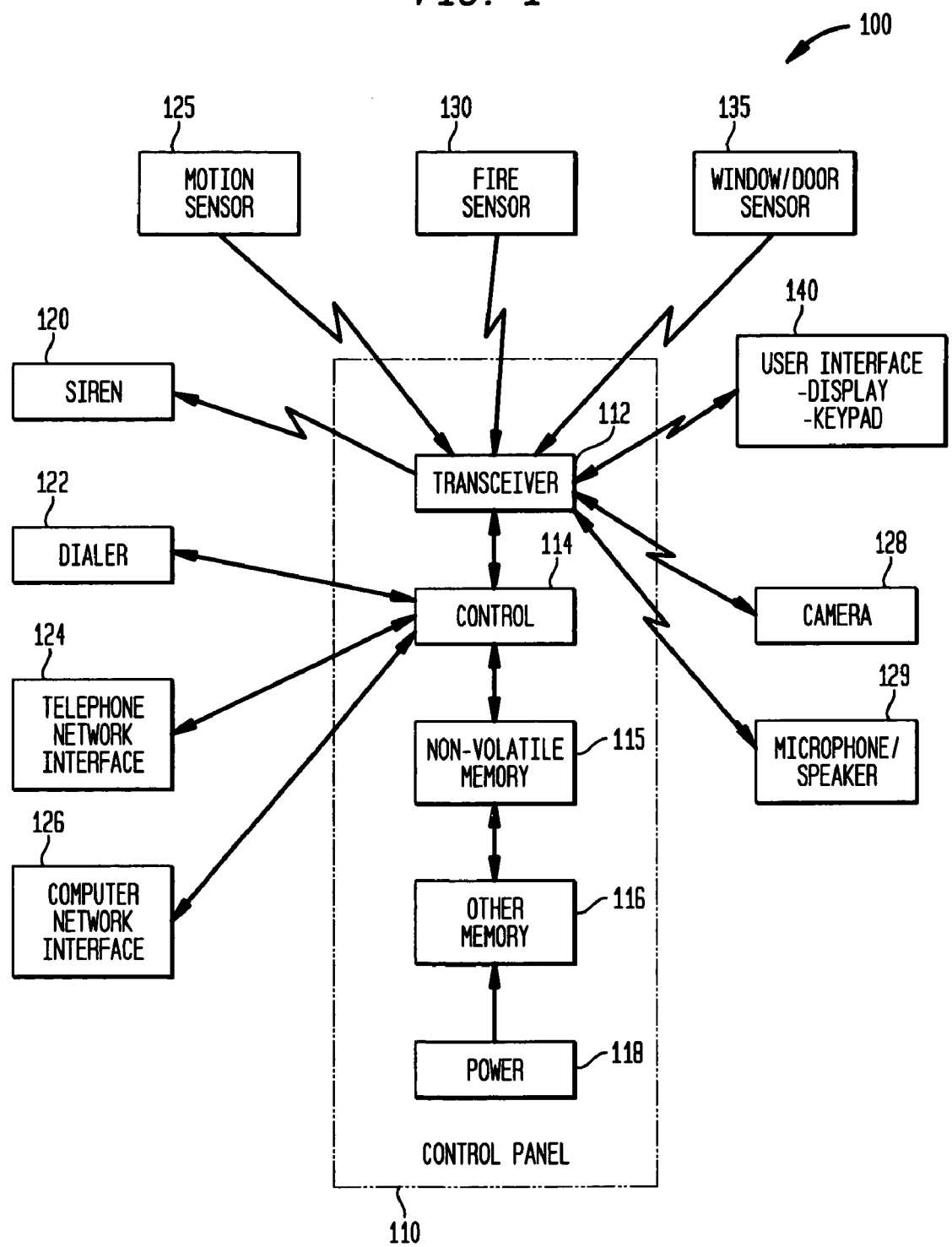
FIG. 1 illustrates an overview of an example security system, according to the invention.

FIG. 1 illustrates an overview of an example security system, according to the invention, for securing a building location such as a residence or business. The security system 100 includes a central control panel 10 that communicates with a number of sensors via wired or wireless paths. The wireless paths may be RF paths, for instance. The control panel 110 may receive signals from motion sensors 125, fire sensors 130, and window and door sensors 135, for instance.

Signals received from a peripheral user interface device 140, such as a keypad and display, a combined display and touch screen, and/or a voice interface, may arm and disarm the system. The user interface device 140 may be the primary interface between the human user and the security system 100. The user interface device 140 may include components that are analogous to the control panel 110, including a control, memory and power source. Optionally, the user interface device 140 includes a transceiver (transmitter and receiver). The user interface device 140 is commonly provided by affixing it to a wall in a readily accessible location, such as near the entrance of a building, while the control panel 110 generally is a larger component that may be installed, e.g., in a closet or basement. Optionally, the user interface device 140 is integrated into the control panel 110.

The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, whether a specific door or window has been opened, and, when the system is armed, whether an alarm has been tripped. The control panel 110 may also have the ability to notify local emergency services and/or a remote facility of an alarm condition via a telephone dialer 122. Furthermore, a telephone network interface 124, such as a modem, allows the control panel 110 to send and receive information via a telephone link. The functionality of the dialer 122 may be combined into the interface 124. A computer network interface 126 allows the control panel 110 to send and receive information via a computer network, such as the Internet. The computer network interface 126 may include an always-on interface, such as a DSL or cable modem, or a network interface card, for example. Or, a dial-up telephone connection may be used. Other communication paths such as long-range radio and a cellular telephone link may also be used. The dialer 122 and interfaces 124 and 126 are typically hardwired to the control panel 110 and activated by the control 114.

One or more cameras 128 may be used to provide image data, including still or motion images, to the control 114 directly or via the transceiver 112. The image data is encoded and compressed for storage and/or transmission in a digital format. An appropriate storage medium such as a hard disk can be used to store the image data. The cameras can be positioned at various locations around the secured building, including the exterior and interior. When an alarm occurs, image data from the camera that has a view of the area monitored by the sensor that tripped the alarm can be stored and communicated to a monitoring station as discussed herein for remote viewing. Similarly, one or more microphones and speakers 129 can provide audio data from different locations around the secured premises to the control 114 directly or via the transceiver 112, and reproduce audio data received by the remote facility, e.g., to provide an intercom capability. When an alarm occurs, audio data from the microphones that cover an area monitored by the sensor that tripped the alarm can be stored and communicated to a remote facility as discussed herein for remote listening. If an alarm is triggered, e.g., by a panic button on a key fob rather than by a sensor in a specific zone of the secured building, all video and/or image data can be communicated to the remote facility.

It is also possible for a security system to receive commands from the remote facility to control its cameras and microphones. For example, a camera may be mounted so that it can change its field of view, such as by zooming in or pivoting, via a motor control. In this case, such movements can be controlled remotely using an appropriate control and communication scheme. It is also possible to change the operating mode of a camera, such as by changing the rate or resolution at which it provides still frames, or switching from a still frame mode to a motion picture mode, or switching from a visible light mode to an infrared light mode, and so forth.

The control panel 110 includes a transceiver 112 for transmitting and receiving wireless signals. The control 114 includes a microprocessor that may execute software, firmware, micro-code or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. A power source 118 provides power to the control panel 110 and typically includes a battery backup to AC power.

According to the invention, an existing security system can be modified to communicate with a remote facility to provide information such as status information, audio and video data, and the like, and to allow a user at the remote facility to provide commands to the local security system. In one approach, existing communication components and transmitting and receiving protocols of the control panel 110 and/or user interface device 140 can be used. The appropriate control logic can be implemented as the control panel 110 and/or user interface device 140 are upgraded. A chip change can also be made if needed. Communication interfaces, such as interfaces 124 and 126, can be added as needed if they are not already present.

The functionality provided by the invention has many advantages. For example, a user at the remote facility can more closely manage and control the status of security systems out in the field, such as for a chain of retail stores or other businesses. The invention allows the remote facility to see the substantially real time status of each of the local security systems, and to control the local security systems. Each local security system is configured to periodically check in with the remote facility according to an update interval. The update interval may be shortened when a specified status of the security system is detected, such as when the security system is in an alarm mode. In such cases, it may be desirable to provide quicker updates. The user can also monitor video and audio data of the secured building locations.

The information provided to the remote facility provides a full status each time the security system checks in. The information can include, for example, alarm status information that indicates, e.g., whether an alarm has been set, when the alarm was set, the alarm type (e.g., intrusion alarm, fire alarm, noxious gas alarm), whether any zones have been bypassed, and other information such as an alert that the local security system has a malfunction or requires maintenance, and the urgency of the need for maintenance (e.g., immediate, within one month, etc.). Further detailed information regarding an alarm may also be provided. For instance, for an intrusion alarm, the local security system may provide information regarding the source of the alarm, such as which zone in a building has triggered the alarm, the type of sensor that has been tripped (window, door, motion, etc.), or whether a panic button such as a holdup button has triggered the alarm. Other information, such as the identity of the person who armed or disarmed the security system can also be provided, based on the password entered during the arming or disarming. Information identifying the building location can likewise be provided. For a business such as a retail store, information regarding whether the store is open or closed can also be provided.

Moreover, the invention enables the user at the remote facility to send commands to control the local security systems, e.g., to arm or disarm the systems, set a bypass mode, and so forth. The bypass mode may be used to ignore a sensor or zone in the secured building location that is triggering false alarms, for instance.

Advantageously, by communicating information via the existing security system components and infrastructure, there is no, or minimal, need for additional equipment in the secured locations. Disruption to the home or business due to installing additional components and wires, for example, is minimal or nonexistent. Furthermore, existing features of the existing security system, such a backup power and central station monitoring, are maintained and leveraged.

Figure 2:
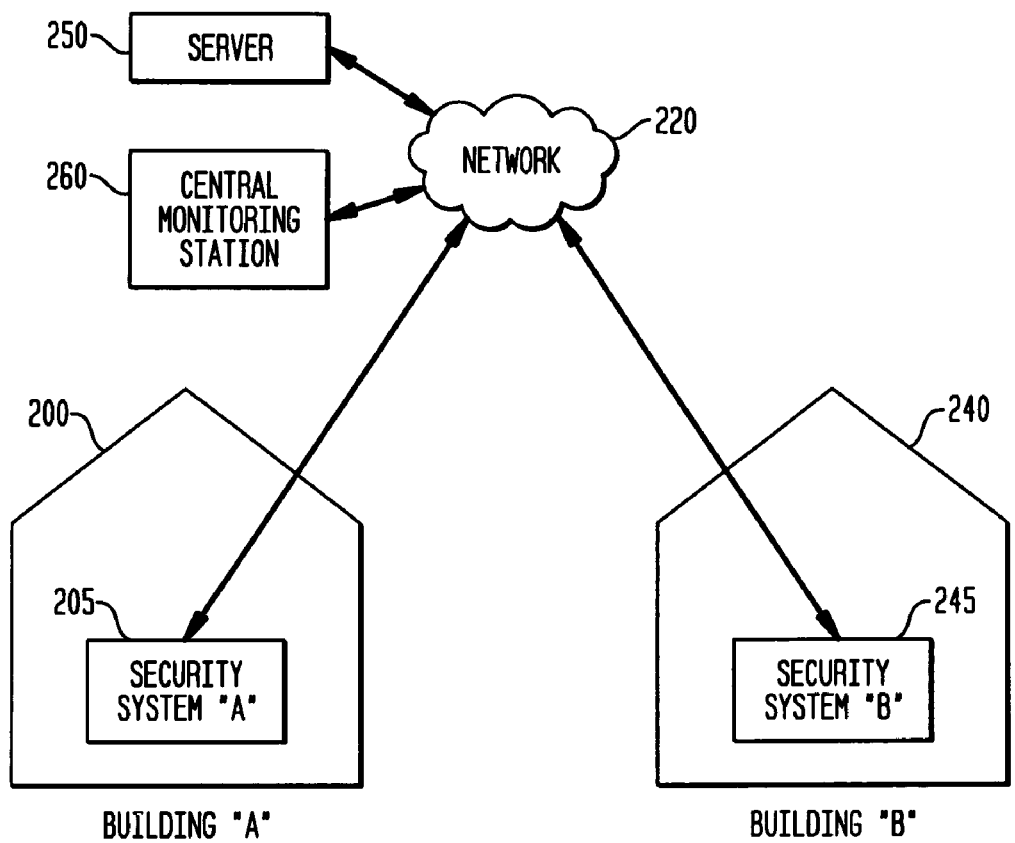
FIG. 2 illustrates an arrangement with two security systems reporting to a remote facility, according to the invention.

FIG. 2 illustrates an arrangement with two security systems reporting to a remote facility, according to the invention. A first building location (building "A") 200 is secured by a first security system (security system "A") 205, while a second building location (building "B") 240 is secured by a second security system (security system "B") 245. The building locations may be separate structures, such as individual homes or business facilities. Or, the building locations may be different parts of a common structure, such as different apartments in an apartment building, or different areas of a business, such as an office in a retail store or factory, and so forth. Note that the concept can be extended to more than two security systems and building locations. For example, dozens of chain stores may be monitored. In a nationwide or worldwide scheme, separate monitoring facilities may be provided in different geographic locations, if desired. Moreover, communication between security systems needed not be bi-directional . Thus, the invention encompasses a scenario where the security systems 205 and 245 can report information to a remote facility, but cannot receive commands from the remote facility.

The security systems 205 and 245 each communicate with a remote facility, which can include a server 250 and/or central monitoring station 260, via one or more networks, such as example network 220. In one approach, the server 250 aggregates data from, and communicates with, the different security systems 205, 245. When asked, or automatically, the server 250 also forwards the received information to the central monitoring station 260. The central monitoring station 260 is typically a staffed facility where users monitor incoming communications to determine when an alarm or other condition is present at the security systems 205, 245 that requires attentions. The user may attempt to determine if an alarm was set inadvertently by telephoning the secured location. If the alarm was not set inadvertently, the user contacts emergency services such as fire or police personnel in the appropriate municipality by telephone to report the alarm. In one possible approach, all communications with the security systems 205, 245, are handled by the server 250, and the server 250 forwards the periodically updated information received from the security systems 205, 245 to the central monitoring station 260. In another possible approach, routine communications with the security systems 205, 245, are handled by the server 250, while alarm messages are sent directly to the central monitoring station 260. In another possible approach, all communications with the security systems 205, 245 are handled by the central monitoring station 260, which subsumes the functions of the server 250. In any case, the security systems 205, 245 communicate with one or more remote facilities which include computers for storing and processing data, and network interfaces such as receivers and transmitters for receiving and transmitting data, respectively.

The network 220 can include essentially any type of communication path or paths, including a telephone link, such as a conventional telephone network. In this case, signaling using a compatible modem may be used. In another approach, the network 220 includes a computer network such as the Internet or an intranet of a corporation or other organization. For instance, the security systems 205 and 245 may use a communications protocol such as TCP/IP to communicate with the remote facility 250. Other communication paths such as satellite or RF radio paths, including, e.g., those using GSM or CDMA techniques, may also be used. Moreover, the different security systems may use different communication paths, and upstream communications to the server 250 or central monitoring station 260 may be on a different path than downstream communications. Similarly, the server 250 and the central monitoring station 260 may communicate via a different network or path than used by the security systems 205, 245. Data may also be communicated on redundant paths to provide additional security.

According to the invention, the security systems 205, 245 periodically transmit data to the remote facility 250 or 260 at regular update intervals, e.g., every ten seconds, to provide the remote facility with an essentially real-time status of each security system. This data can include essentially any information that is maintained by the security systems 205, 245. For example, the information can include an armed status indicating, e.g., whether the security system is armed and whether zones are bypassed, a trouble code, a maintenance status, or the like. The information can also indicate whether a door or window is open, and whether a motion sensor has been tripped. Information from video and audio data can also be provided to the remote facility 250 or 260. Moreover, the security systems 205, 245 may interact with, or be part of, an automation network such as a home automation network, in which case information regarding the automation network can also be provided. This may include, for instance, heating or air conditioning system settings. Information from a medical device such as a heart rate monitor can also be provided to the remote facility 250 or 260, e.g., to allow monitoring of the medical condition of a patient.

In response to the periodically updated information received in periodically transmitted messages transmitted by the security systems 205, 245, the remote facility 250 or 260 processes the message and performs an action according to control logic implemented therein.

Note that it is not necessary for the remote facility 250 or 260 to query the security systems 205, 245 to obtain information from them. However, this option is also possible. For example, certain types of information can be provided automatically during the periodic transmissions, while other types of information are only provided on request, or when a specific event has occurred, such as an alarm event. In another option, all information is provided automatically. Having the security systems 205, 245 automatically provide their status information to the remote facility 250 or 260 at predetermined intervals is advantageous since it provides a higher level of security. For example, each security system may communicate with the network 220 via a firewall, in which case it is more secure to transmit through the firewall, from the security system to the network, and not from the network to the security system. Moreover, the remote facility 250 or 260 is continuously informed of the status of the different security systems and can therefore respond to events at the security systems quickly.

Note also that the remote facility 250 or 260 may also have the capability to download software to the security systems 205, 245 to change their behavior, including changing the update interval and other pre-programmed behaviors, such as the types of data transmitted during the periodic updates.

Figure 3:
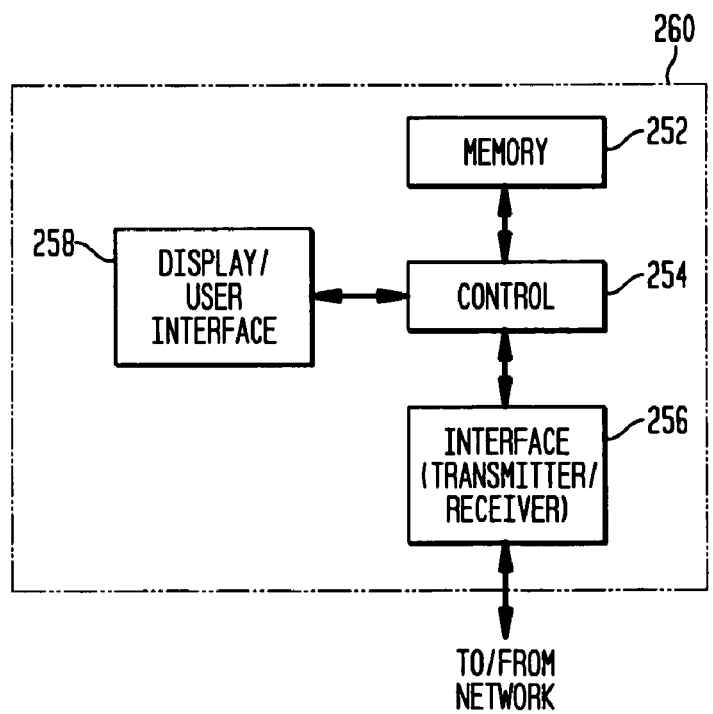
FIG. 3 illustrates a remote facility, according to the invention.

FIG. 3 illustrates a remote facility according to the invention. The remote facility, illustrated as the central monitoring station 260, can include a general purpose computer that is programmed to achieve the functionality described herein. The remote facility 260 is typically a staffed facility that is remote from the security systems which it serves. The staff at the remote facility 260 may monitor the periodically updated information provided by the different security systems and take appropriate actions such as notifying emergency personnel when an alarm is tripped. The staff can also provide compliance monitoring by ensuring that the security systems are being used according to a company policy, for instance. Multiple remote facilities may be provided as needed to serve groups of security systems.

The remote facility 260 includes a communications interface 256, including a receiver and transmitter, for communicating with different security systems and/or servers, such as server 250, via one or more networks. A control 254 is used to execute software instructions stored in the memory 252 to achieve the desired functionality, including recovering the periodically updated information and other data from the security systems, and initiating transmissions to the security systems. A memory resource used for storing software or other instructions that are executed by the control 254 to achieve the functionality described herein may be considered a program storage device. The memory 252 may also store information for contacting each of the security systems. For example, when the remote facility 260 and a security system communicate via a computer network, the remote facility may store an IP address of the security system. In this case, the interface 256 may be a network interface card. When the remote facility 260 and a security system communicate via a telephone network, the remote facility may store a phone number of the security system as well as modem settings. In this case, the interface 256 may be a modem. In practice, the remote facility 260 may have a number of computers with different interfaces to enable communication with a large number of security systems at the same time via different communication paths. Encryption and authentication protocols may be implemented as well to ensure secure communications between the security systems and the remote facility.

The remote facility 260 further includes one or more displays/user interfaces 258 that display information regarding the security systems based on the received periodically updated information. Various specific display configurations, discussed below, may be used to convey information to the human user.

Figure 4:
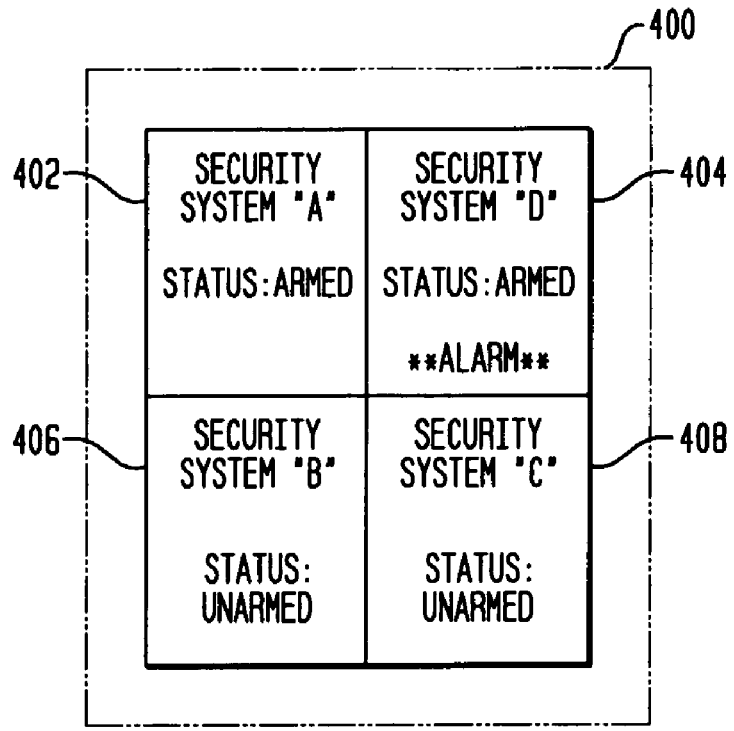
FIG. 4 illustrates an example user interface at a remote facility, with display regions sorted by armed status, according to the invention.

FIG. 4 illustrates an example user interface at a remote facility, with display regions sorted by armed status, according to the invention. The interface 400 may be a graphical user interface that is generated on one or more displays or screens 258, such as computer monitors, by executing software instructions on a computer. The interface can be interactive in that it receives commands from a user for displaying information in specified ways. In the example shown, status information is displayed for four security systems, denoted by letters "A", "B", "C", and "D", in respective display regions or cells 402, 404, 406, and 408, respectively. For example, the display regions 402 and 404 indicate that security systems "A" and "D" are armed, while the display regions 406 and 408 indicate that the security systems "B" and "C" are unarmed. Furthermore, the display region 404 indicates that the security system "D" has reported an alarm condition. Note that text and/or graphical elements such as icons can be used in the interface.

In the interface 400, the displaying of the information on the display regions is sortable according to at least one type of status information, such as an armed state, an alarm state, or a trouble state. For example, the displaying may be sorted so that information for security systems that are armed appears more prominently, such as on a higher row, than the information for security systems that are unarmed. This is the case in the interface 400. The displaying may be sorted so that information for security systems that have an alarm tripped appears more prominently than for security systems that do not have an alarm tripped, or so that information for security systems that have a trouble code appears more prominently than for security systems that do not have a trouble code. Sorting based on multiple factors, with different priorities assigned to each factor, may also be used. Furthermore, an appearance of each of the display regions may be set based on the at least one type of status information associated therewith, such as an armed state, an alarm state, and/or a trouble state of the associated security system. For instance, the display region 402 may be yellow to indicate the armed state, the display region 404 may be flashing red to indicate the alarm state, and the display regions 406 and 408 may be green to indicate the unarmed state. Various other possibilities will be understood by those skilled in the art.

Figure 5:
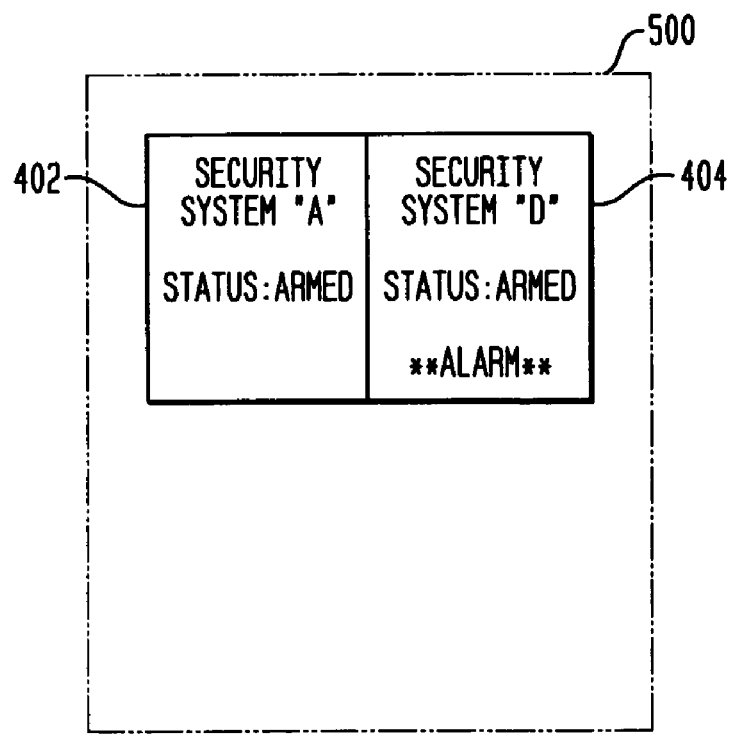
FIG. 5 illustrates an example user interface at a remote facility, with display regions filtered by armed status, according to the invention.

FIG. 5 illustrates an example user interface at a remote facility, with display regions filtered by armed status, according to the invention. Filtering allows information to be displayed for security systems according to at least one factor, such as whether the security systems are in a specified armed state, alarm state, or trouble state. In the example interface 500, filtering is performed to display the information for security systems that are in an armed state. This includes security systems "A" and "D", whose information is provided in display regions 402 and 404. The information for security systems "B" and "C" is not provided because they are in an unarmed state.

Figure 6:
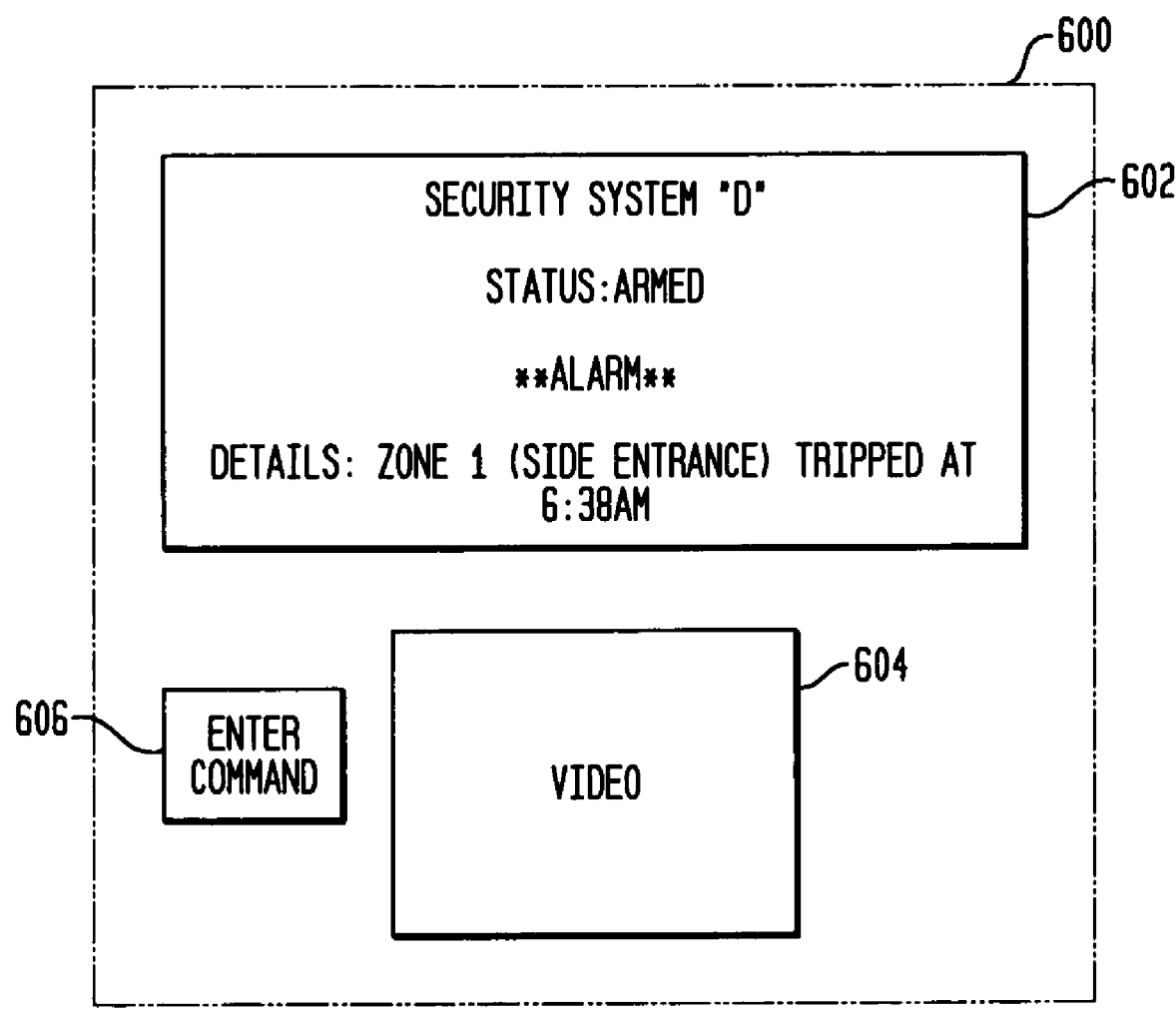
FIG. 6 illustrates an example user interface at a remote facility, with a new display region providing further details of a security system, according to the invention.

FIG. 6 illustrates an example user interface at a remote facility, with a new display region or sub-window providing further details of a security system, according to the invention. The interface 600 includes a display region 602 that displays information regarding at least one of the security systems at a higher level of detail. For example, further details regarding the alarm at security system "D" may be provided, including a description of the zone of the security system which tripped the alarm, and the time the alarm was tripped. Additionally, video from the secured location may be displayed on a display region 604 to assist the user in monitoring the location. As indicated previously, video may be provided by the security systems on certain occasions, such as when an alarm is tripped, or on a regular basis, with the other periodically updated data. Audio data may similarly be provided. A display region 606 prompts the user to enter a command. If this option is selected, a new interface appears that presents the user with different options for controlling the security system "D". For example, the user may send a command to disarm the security system after telephoning the secured location and confirming that the alarm was a false alarm. The user may also send a command to bypass a sensor or zone in the secured building location that is triggering false alarms, for instance. A command may also be provided to remotely-control cameras in the secured location to obtain further visual information regarding a possible intruder, such as by zooming in on an area or positioning the camera to view different areas.

Referring still to FIG. 6, note that the display region 600 providing the detailed information may be provided on a screen which is different than a screen on which the less detailed display regions 402, 404, 406 and 408 are provided. For example, two or more monitors may be arranged in a bank of monitors. In another possible approach, the display region 600 appears on the same screen as the screen on which the display regions 402, 404, 406 and 408 are provided. The display region 600 may be provided on a separate portion of the screen, or may partially or fully overlap the portion with the display regions 402, 404, 406 and 408. Or, the display region 600 may be provided in place of the display regions 402, 404, 406 and 408.

Any suitable scheme may be provided that allows the user to interact with the user interface. For example, a pointing device such as a mouse may be used to position a cursor over one of the display regions 402, 404, 406 or 408 to select one of the display regions. In response, the more detailed interface 600 is displayed. The user may also position the cursor over the display region 606 to cause a corresponding new interface to appear. User commands may also be provided by keyboard or voice command, for instance.

Generally, software running at the remote facility mines the periodically updated data from the different security systems to provide a spreadsheet like user interface. This interface or page will change in real time according to the update interval with which the security systems check in. The user can click on one of the cells to obtain further information about the associated security system by drilling down to one or more additional displays. Also, the user is able to send commands to the security systems from the remote location.

In one possible implementation, the invention creates a system that allows a central station run by a businesses such as a large chain store, or run by a third party vendor, to manage multiple security systems in real time from a remote location. The current status of all partitions, zones and any other data monitored by each security system is provided to the central station. A minimal amount of data, such as 100 bytes, may be allocated for each periodic transmission. On the initial power up or data change in a control panel of a security system, the control panel will provide all descriptors for related items to the PC software running at the remote facility to allow the software to convert the data sent on each check in to something a human can understand. For example, "zone 1" can be converted to "side entrance".

The control panel of the security system sends this data to the remote facility at a time interval such as every ten seconds while the control panel is not in a state of alarm, and every five seconds when in an alarm state. Note these times can be programmable in the control panel and can be changed via a command from the remote facility, if required.

The software running at the remote facility can be a Windows program that interfaces to the control panel via a serial port or over an IP network. The software takes the latest information sent for each security system and updates the current 'real time" status of each system so that a user using the software can see the full status of any connected security system. The PC software will allow a user to "connect" to an individual security system or to select groups of security systems based on various criteria, and cause commands to be sent to the appropriate system. For example, a user may click on a specific store and send an "arm all partitions" command to that store. The acknowledgement of such a command is the change in status of the store that would be sent the next time the system checked in.

The software may include batch commands, scheduled commands, upload and downloading commands, and provide various sorting options based on system status, armed state, alarm state, trouble codes, and the like.

The default view of the software can appear as a spread sheet, where each cell represent a security system. The color of the cell can represent the status of the system so a user can quickly identify its status. The user will be able to define the colors to represent each and every possible system status. If a user clicks on a given cell, the software will open a new window, which will allow the user to see much more information about the security system they clicked on. In an environment where two monitors are used, a user will be able to see, on one screen, the further detailed information for the security system they clicked on, while the other screen will still have the status of all the security systems in question. The software may be configured in such a way to display the information for only certain systems, e.g., a subset of all systems, so that more systems may be viewed at once. For example, the software may be setup to display only systems that are currently in alarm, or only those that are armed, etc. The setup of these groups will be based on a system ID that the user can define for each system. The system ID can be a link to a unit's MAC ID. Moreover, any commands performed by any user can be logged.

The software can be run on as many PCs as desired, with each PC only showing the information requested. For example, one PC may show all the stores currently open, while another may show all the stores currently in alarm, and so forth. The system will have different authority levels for logging on, and these levels will determine what a user of the system is allowed or not allowed to do. In cases where multiple remote facilities are required due to the amount of stores or other locations being monitored, the software should be able to manage this as well. Moreover, if video or audio is available at a given location, the software should allow that video or audio to be brought up when a location is selected via the user interface.

Essentially, the invention enables the remote facility to respond to the information provided by the security systems, either automatically, and/or by user command, to control the security systems. Moreover, this response can involve any functionality that is available at the security systems. For example, the remote facility may respond to receipt of information indicating that an alarm is set in a security system by sending a command to the security system to arm any zones or partitions, e.g., logical group of zones, that are not currently armed. This may be advantageous in an institution such as a school when an emergency condition such as a missing child is reported, e.g., by a panic button/ pull station connected to the security system in the school, and it is desired to place the school in a lockdown mode. The remote facility can respond to the communication indicating the panic button has been pressed by running a batch job to set several unarmed zones in the school to the armed mode at once.

The remote facility may further control security systems individually or in groups. For instance, the remote facility can respond to the report of an emergency at one school by controlling the security systems at other schools in the neighborhood, e.g., to set them to the armed mode. Various devices such as electronically locked doors can also be set to be locked or otherwise controlled in the school to limit access to specific personnel, e.g., by entry of a pass code or insertion of a coded smart card. In another example, the remote facility can respond to the report of an alarm at a retail store in a group of proximate stores by controlling security systems in the remaining stores to limit access, such as by automatically locking their doors. Such actions may be advantageously programmed to occur automatically to provide the quickest response in an emergency.

In other, less urgent situations, the remote facility may control the security systems, individually or in groups, by providing updated administrative information, such as adding or deleting authorizations for new or departing employees, respectively. For instance, a new employee that requires access to multiple retail locations can be set up quickly by communicating authorization data to the security systems at the different locations as a group. This may involve, for instance, providing a pass code to the different security systems along with information regarding the authorization, such as specific rooms or zones that the employee is authorized to enter, and specific times of day or days of week when the authorization is in effect. The various authorizations can be quickly removed as well when the employee is terminated by sending appropriate information from the remote facility to the different security systems to delete the authorization. Likewise, employee authorizations can be easily updated at all locations, such as when the employee's work schedule changes. Other information such as data indicating when a retail location is closed, or a holiday schedule of closings, can similarly be quickly provided from the remote facility to any number of retail locations. Providing such information from the remote facility to the different security systems at the different locations avoids the needs for re-programming each security system individually, which is a much slower and error prone process.

An appropriate user interface can be provided to allow a user to provide the administrative information. For example, FIG. 7 illustrates an example user interface 700 at a remote facility, with a display for setting up an employee authorization, according to the invention. At line 1, the user is prompted to enter an identifier of the employee such as an employee number. At line 2, the user is prompted to enter a pass code that has been assigned to the employee. Or, the pass code may be automatically generated. At line 3, the user identifies store locations, for example, where the employee is to have access. At line 4, a schedule for the employee is selected, and at line 5, a shift is selected. At line 6, an area in which the employee is granted access is selected. Once all entries are made, a "submit" button is selected to have the information entered and transmitted from the remote facility to the security systems of the involved locations. For example, if all stores are selected at line 3, a message is transmitted to the security systems of all stores to update their authorization information so that the employee will be able to access the designated areas at the designated times, such as by entering the pass code into keypads at different doors in the stores.

Furthermore, it is possible to configure the remote facility to automatically record information from a security system. For example, when an alarm is set at a security system, the remote facility may record the status information at the security system's control panel. This information may indicate, e.g., which sensors were tripped in which zones of a building, and the associated time of day. This may assist investigators in investigating a crime, for instance, by allowing later playback of the status information. Also, video information from cameras at the security system may be recorded for subsequent playback at the remote facility. An appropriate user interface can be provided to allow a user to play back the recorded information.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for monitoring security systems, comprising:
   receiving, at a facility that is remote from the security systems, periodically updated information from the security systems, according to respective update intervals of the security systems; and
   displaying information regarding the security systems, on a user interface, responsive to the periodically updated information;
   wherein the security systems each secure respective building locations, and the respective update interval of at least one of the security systems is shortened when the at least one of the security systems is in an alarm mode compared to when the at least one of the security systems is not in the alarm mode.

2. The method of claim 1, further comprising: responsive to a user command, filtering the displaying of the information regarding the security systems according to at least one factor.

3. The method of claim 2, wherein:
   the at least one factor according to which the displaying of the information is filtered comprises at least one of an armed state, an alarm state, and a trouble state of the security systems.

4. The method of claim 1, further comprising:
   responsive to a user command that selects at least one of the security systems via the user interface, initiating a communication from the remote facility to at least one of the security systems for controlling the at least one of the security systems.

5. The method of claim 1, wherein:
   the remote facility comprises a central monitoring station and each of the building locations comprises a business in a chain of associated business.

6. The method of claim 1, further comprising:
   responsive to receipt of the periodically-updated information, communicating a command to the security systems for controlling the security systems as a group.

7. The method of claim 1, further comprising:
   responsive to receipt of the periodically-updated information, communicating a command to at least one of the security systems for controlling the at least one of the security systems individually.

8. The method of claim 1, further comprising:
   responsive to receipt of the periodically-updated information from a particular one of the security systems indicating an alarm condition in a specified zone or partition, communicating a command to the particular one of the security systems for arming other, unarmed zones or partitions thereof.

9. The method of claim 1, further comprising:
   responsive to receipt of the periodically-updated information from a particular one of the security systems indicating an alarm condition, communicating a command to other ones of the security systems for controlling the other ones of the security systems.

10. The method of claim 1, wherein:
    the user interface enables a user to update administrative information of the security systems.

11. The method of claim 10, wherein:
    the administrative information comprises an employee authorization.

12. The method of claim 1, wherein:
    the user interface comprises a plurality of display regions, each of which displays information regarding a corresponding one of the security systems at a first level of detail.

13. The method of claim 12, wherein:
    the display regions comprise cells in a grid, where each cell displays the information regarding the corresponding one of the security systems.

14. The method of claim 12, wherein:
    the information regarding each of the security systems comprises at least one type of status information; and
    an appearance of each of the plurality of display regions is set based on the at least one type of status information associated therewith.

15. The method of claim 14, wherein:
    the at least one type of status information for which the appearance of each of the plurality of display regions is set includes at least one of an armed state, an alarm state, and a trouble state.

16. The method of claim 12, wherein:
    the information regarding each of the security systems comprises at least one type of status information; and the displaying of the information on the plurality of display regions is sortable according to at least one type of status information.

17. The method of claim 15, wherein:
the at least one type of status information for which the displaying of the information on the plurality of display regions is sortable includes at least one of an armed state, an alarm state, and a trouble state.

18. The method of claim 12, further comprising:
responsive to a user command that selects at least one of the security systems via the user interface, displaying information regarding the at least one of the security systems at a second, higher level of detail.

19. The method of claim 18, wherein:
the higher level of detail provides at least one of audio and video data of the building location secured by the at least one of the security systems.

20. The method of claim 18, wherein:
the information at the second, higher level of detail is displayed on a screen which is different than a screen on which the plurality of display regions are provided.

21. The method of claim 1, further comprising:
recording the periodically-updated information, and subsequently playing back the recorded information via the user interface.

22. A security apparatus for monitoring security systems, comprising:
means for receiving, at a facility that is remote from the security systems, periodically updated information from the security systems, according to respective update intervals of the security systems; and
means for displaying information regarding the security systems, on a user interface, responsive to the periodically updated information;
wherein the security systems each secure respective building locations, and the respective update interval of at least one of the security systems is shortened when the at least one of the security systems is in an alarm mode compared to when the at least one of the security systems is not in the alarm mode.

23. A security apparatus, comprising:
means for maintaining periodically updated status information regarding a secured building location; and
means for periodically transmitting the periodically updated information to a remote facility according to an update interval;
wherein the remote facility displays information regarding the security apparatus on a user interface, responsive to the periodically updated information, and the respective update interval of at least one of the security systems is shortened when the at least one of the security systems is in an alarm mode compared to when the at least one of the security systems is not in the alarm mode.

24. The security apparatus of claim 23, wherein: the update interval is shortened when an alarm condition is detected at the secured building location.

* * * * *